United States Patent
Diard

(10) Patent No.: US 7,602,395 B1
(45) Date of Patent: Oct. 13, 2009

(54) PROGRAMMING MULTIPLE CHIPS FROM A COMMAND BUFFER FOR STEREO IMAGE GENERATION

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 428 days.

(21) Appl. No.: 11/112,413

(22) Filed: Apr. 22, 2005

(51) Int. Cl.
*G06T 15/00* (2006.01)
(52) U.S. Cl. .................. 345/505; 345/502; 345/520
(58) Field of Classification Search ............... 345/505, 345/502, 503, 520, 522
See application file for complete search history.

(56) References Cited

U.S. PATENT DOCUMENTS

| | | | | |
|---|---|---|---|---|
| 4,449,201 A | * | 5/1984 | Clark | 345/561 |
| 5,321,810 A | * | 6/1994 | Case et al. | 345/562 |
| 5,598,525 A | * | 1/1997 | Nally et al. | 345/546 |
| 5,664,163 A | * | 9/1997 | Yutaka et al. | 345/522 |
| 5,790,130 A | | 8/1998 | Gannett | |
| 5,794,016 A | * | 8/1998 | Kelleher | 345/505 |
| 5,841,444 A | | 11/1998 | Mun | |
| 6,023,381 A | | 2/2000 | Grigor et al. | |
| 6,049,859 A | * | 4/2000 | Gliese et al. | 712/17 |
| 6,078,339 A | | 6/2000 | Meinerth et al. | |
| 6,166,748 A | * | 12/2000 | Van Hook et al. | 345/522 |
| 6,191,800 B1 | | 2/2001 | Arenburg et al. | |
| 6,259,461 B1 | | 7/2001 | Brown | |
| 6,317,133 B1 | | 11/2001 | Root et al. | |
| 6,362,818 B1 | | 3/2002 | Gardiner et al. | |
| 6,445,391 B1 | | 9/2002 | Sowizral et al. | |
| 6,469,746 B1 | | 10/2002 | Maida | |
| 6,473,086 B1 | | 10/2002 | Morein et al. | |
| 6,570,571 B1 | | 5/2003 | Morzumi | |
| 6,724,390 B1 | | 4/2004 | Dragony et al. | |
| 6,747,654 B1 | | 6/2004 | Laksono et al. | |
| 6,781,590 B2 | | 8/2004 | Katsura et al. | |
| 6,844,879 B2 | * | 1/2005 | Miyauchi | 345/502 |
| 2003/0016223 A1 | * | 1/2003 | Miyauchi | 345/505 |
| 2003/0086601 A1 | * | 5/2003 | Lee et al. | 382/154 |
| 2003/0128216 A1 | | 7/2003 | Walls et al. | |
| 2004/0075623 A1 | | 4/2004 | Hartman | |
| 2005/0012749 A1 | | 1/2005 | Gonzalez | |
| 2005/0088445 A1 | | 4/2005 | Gonzalez | |

FOREIGN PATENT DOCUMENTS

EP     0571969     5/2003

OTHER PUBLICATIONS

Whitman, "Dynamic Load Balancing For Parallel Polygon Rendering" IEEE Computer Graphics and Applications, IEEE Inc. New York, U.S. vol. 14, No. 4, pp. 41-48, Jul. 1, 1994.

* cited by examiner

*Primary Examiner*—Phu K Nguyen
(74) *Attorney, Agent, or Firm*—Townsend and Townsend and Crew LLP

(57) ABSTRACT

Multiple graphics devices are operable in parallel to render stereo images using efficient programming techniques. The same command stream is delivered to each graphics device, and device masks are used to control the execution of commands by different graphics devices. A viewing transform command corresponding to a left-eye transform is executed by one device while a viewing transform command corresponding to a right-eye transform is executed another device. Other rendering commands are executed by both devices to render the same image from somewhat different viewpoints.

18 Claims, 8 Drawing Sheets

PROGRAMMING MULTIPLE CHIPS FROM A COMMAND BUFFER FOR STEREO IMAGE GENERATION

CROSS-REFERENCES TO RELATED APPLICATIONS

The present disclosure is related to commonly-assigned co-pending U.S. patent application Ser. No. 10/639,893, filed Aug. 12, 2003, entitled "Programming Multiple Chips from a Command Buffer," which disclosure is incorporated herein by reference for all purposes.

BACKGROUND OF THE INVENTION

The present invention relates in general to the field of computer graphics and more particularly to computer generation of stereo images. Many computer graphic images are created by mathematically modeling an approximation of the interaction of light with a three dimensional scene from a given viewpoint. This process, called rendering, generates a two-dimensional image of the scene from the given viewpoint, and is analogous to taking a photograph of a real-world scene. Stereo images can be created by rendering two somewhat different images of the same scene; one image is viewed by a left eye while the other is viewed by a right eye, thereby creating the illusion of a single three-dimensional image.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

To maximize rendering performance, the graphics processing subsystem may include two or more graphics processing units (GPUs) operating in parallel. The graphics processing units can divide the rendering workload in a number of different ways. For example, different portions of an image can be rendered in parallel by different GPUs. The portions are then combined to produce a complete rendered image. In another example parallel rendering scheme, each GPU renders one image in a sequence of images. In still another example, two GPUs can operate in parallel to render stereo images, with one GPU rendering left-eye images while the other GPU renders right-eye images.

Programming multiple GPUs with a CPU is one difficulty arising from parallel rendering schemes. In parallel rendering schemes, GPUs require a mixture of rendering commands common to all of the GPUs in the graphics processing subsystem and rendering commands specific to each GPU. However, programming each GPU with different rendering commands and data often requires a large allocation of system resources for each GPU. This programming overhead makes parallel rendering schemes inefficient and in some cases even limits the total number of GPUs that can be used by the graphics processing subsystem.

Therefore, it is desirable to have an efficient system and method for programming multiple graphics processing units with rendering commands while consuming a minimal amount of system resources. It is further desirable to be able to program multiple graphics processing units with both rendering commands common to all of the graphics processing units and rendering commands specific to one or more graphics processing units.

BRIEF SUMMARY OF THE INVENTION

Embodiments of the present invention provide graphics devices operable in parallel to render stereo images and efficient techniques for programming such graphics devices for stereo image generation. The same command stream is advantageously delivered to each graphics device, and device masks are used to control the execution of commands by different graphics devices. In particular, the device masks are used such that a viewing transform command corresponding to a left-eye transform is executed by one device (or group of devices) while a viewing transform command corresponding to a right-eye transform is executed by another device (or group of devices). Other rendering commands for the image are executed by both devices (or groups of devices) so that the same image is rendered from somewhat different viewpoints. The two images can then be delivered to a suitably configured stereo display device for viewing by a user.

According to one aspect of the present invention, a method for generating a stereo image in a graphics subsystem comprising multiple graphics devices includes communicating a first device mask command and a first viewing transform command to each of the graphics devices, with the first device mask command designating a first subset of the graphics devices to execute the first viewing transform command. A second device mask command and a second viewing transform command are also communicated to each of the graphics devices, with the second device mask command designating a second subset of the graphics devices to execute the second viewing transform command. A third device mask command and a rendering command are also communicated to each of the graphics devices, with the third device mask command designating both the first subset and the second subset of the graphics devices to execute the rendering command.

In some embodiments, a unique identifier is associated with each of the graphics devices. The first device mask command can designate the first subset of the graphics devices according to the unique identifiers associated with the graphics devices. For example, the first device mask command might include a set of bits, each bit associated with one of the unique identifiers and adapted to designate the inclusion of one of the graphics devices in the first subset of the graphics devices.

Various graphics devices can be used in combination. For example, at least one of the graphics devices can be a graphics processing unit, and at least one of the graphics devices can be a coprocessor.

In some embodiments, a program flow command is also communicated to each of the graphics devices. The program flow command is advantageously executed by each of the graphics devices regardless of the device mask commands.

A variety of communication techniques may be used. For example, in some embodiments, commands are communicated with each of the graphics devices via a single memory aperture. In other embodiments, commands are communicated with each of the graphics devices via a bridge chip. In still other embodiments, the commands are written into a command buffer adapted to be read asynchronously by each of the graphics devices.

According to another aspect of the present invention, a graphics device is adapted to operate in parallel with at least one other graphics device. The graphics device includes a core unit adapted to execute commands and a front end unit adapted to receive a stream of commands and communicate commands from the stream to the core unit. The front end unit is further adapted to determine which commands to communicate to the core unit based on a device mask command included in the stream. The command stream includes a first device mask command associated with a first viewing transform command corresponding to a left-eye view of a scene and a second device mask command associated with a second viewing transform command corresponding to a right-eye view of the scene; in response to the first and second device mask commands, the front-end unit communicates only one of the first and second viewing transform commands to the core unit. The graphics processing device might be, for example, a graphics processing unit or a coprocessor.

In some embodiments, the front end unit is further adapted to execute commands associated with program flow regardless of the first and second device mask commands.

In some embodiments, the command stream further includes a third device mask command associated with a rendering command; in response to the third device mask command, the front-end unit communicates the rendering command to the core unit.

In some embodiments, a unique identifier is associated with the graphics device, and the third device mask command and only one of the first and second device mask commands each include a reference to the unique identifier. In some embodiments, the device mask command includes a bit mask including a bit associated with the graphics device.

According to still another aspect of the present invention, a computer program product includes a computer readable medium encoded with program code. The program code includes program code for communicating a first device mask command and a first viewing transform command to each of multiple graphics devices; the first device mask command designates a first subset of the graphics devices to execute the first viewing transform command. The program code further includes program code for communicating a second device mask command and a second viewing transform command to each of the graphics devices; the second device mask command designates a second subset of the graphics devices to execute the second viewing transform command. The program code further includes program code for communicating a third device mask command and a rendering command to each of the graphics devices; the third device mask command designates both the first subset and the second subset of the graphics devices to execute the rendering command. In some embodiments, the program code further includes program code for communicating a program flow command to each of the graphics devices; the program flow command is executed by each of the graphics devices regardless of the device mask commands.

The following detailed description together with the accompanying drawings will provide a better understanding of the nature and advantages of the present invention.

DETAILED DESCRIPTION OF THE INVENTION

Figure 1:
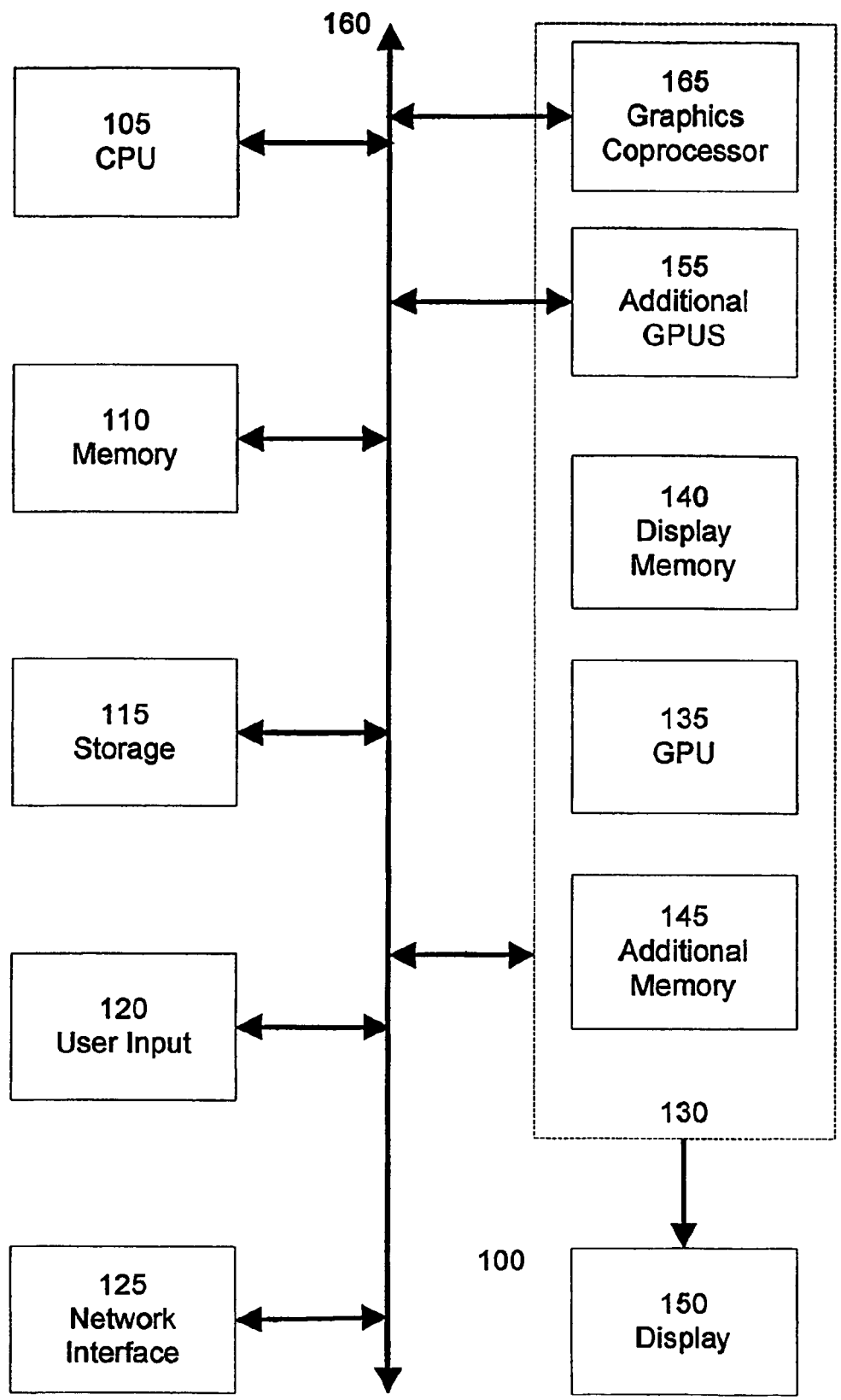
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X, and Hypertransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and additional GPUs 155.

Additional GPUs 150 can be located on the same circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge chip used to control the data bus 160.

Figure 2A:
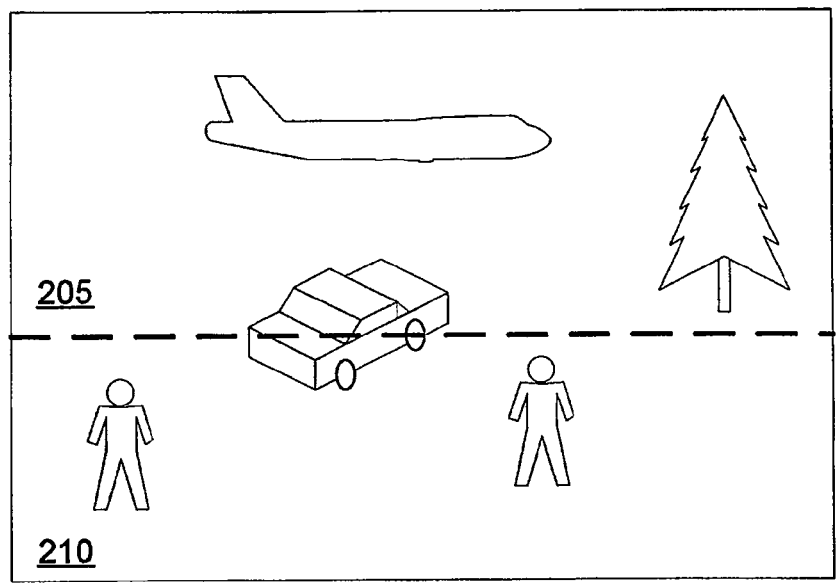
FIGS. 2A and 2B illustrate a method for rendering portions of an image in parallel and a prior system for programming graphics processing units to perform the same.
Figure 2B:
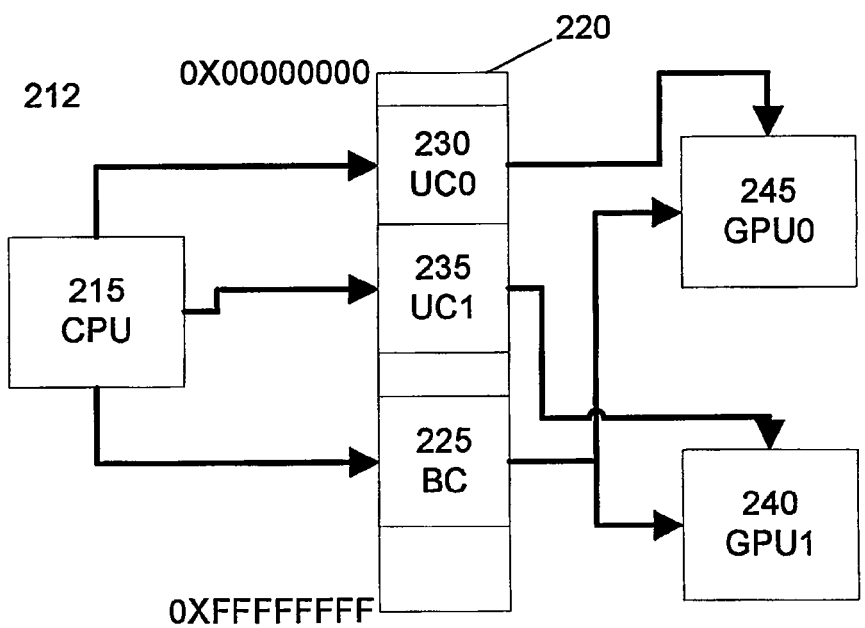

FIGS. 2A and 2B illustrate a method for rendering portions of an image in parallel and a prior system for programming graphics processing units to perform the same. Image 200 represents an example output image to be rendered by two or more GPUs operating in parallel. Image 200 is rendered by splitting the image into different portions, with each portion rendered by at least one GPU. In this example, image portion 205 is rendered by a first GPU and image portion 210 is rendered by a second GPU.

In general, split-frame parallel rendering schemes such as that illustrated by FIG. 2A require GPUs to be programmed with a combination of common rendering commands, which are executed by all of the GPUs of the system, and specific rendering commands, which are executed by a subset of the GPUs of the system. In the example of FIG. 2A, both GPUs are programmed with common rendering commands necessary to render all of the geometry and shading of the scene. The GPUs are then programmed with separate rendering commands to define clipping windows corresponding to image portions 205 and 210.

FIG. 2B illustrates a prior system 212 for programming graphics processing units to perform split-frame parallel rendering. System 212 uses memory-mapped I/O to communicate commands and data between the CPU 215 and the GPUs 240 and 245. In memory-mapped I/O, commands and data written to a predetermined range of memory addresses is communicated to the GPUs 240 and 245, and conversely, data from the GPUs 240 and 245 can read from the predetermined range of memory addresses by the CPU 215.

Memory map 220 graphically represents the range of available memory addresses in system 212. Memory map 220 contains several apertures, or ranges of memory addresses used to communicate with the GPUs 240 and 245. Broadcast aperture 225 enables the CPU to communicate with all of the GPUs in the system 212 simultaneously. Commands and data written to the broadcast aperture are distributed to all of the GPUs 240 and 245, as well as any other GPUs in the system 222. In some systems, a bridge chip is associated with the broadcast aperture 225 and is adapted to copy data written to the broadcast aperture 225 to each GPU in the system 212.

In addition to the broadcast aperture 225, the memory map also includes a set of unicast apertures 230 and 235. Unicast apertures 235 and 230 are adapted to distribute commands and data to GPUs 240 and 245, respectively. Commands and data written to a unicast aperture will only be distributed to the GPU associated with the unicast aperture. The unicast apertures enable the CPU 215 to program GPUs 230 and 235 separately.

The use of broadcast and unicast apertures to program multiple GPUs introduces several limitations. First, there is typically a separate unicast aperture for each GPU in a system. As each typical unicast aperture can be 256 megabytes in size, systems with a large number of GPUs often need to reserves gigabytes of address space for the apertures. The large address space requirements can limit the performance of systems, and in extreme cases limit the potential number of GPUs in a system, particularly with 32-bit systems that are often limited to 4 gigabytes of total address space. Additionally, some systems require that the GPUs operating in parallel be synchronized. To prevent de-synchronization, when the CPU writes commands and data to one unicast aperture, the CPU must also write null commands and padding data to all of the other unicast apertures. This makes programming individual GPUs very inefficient.

Figure 3:
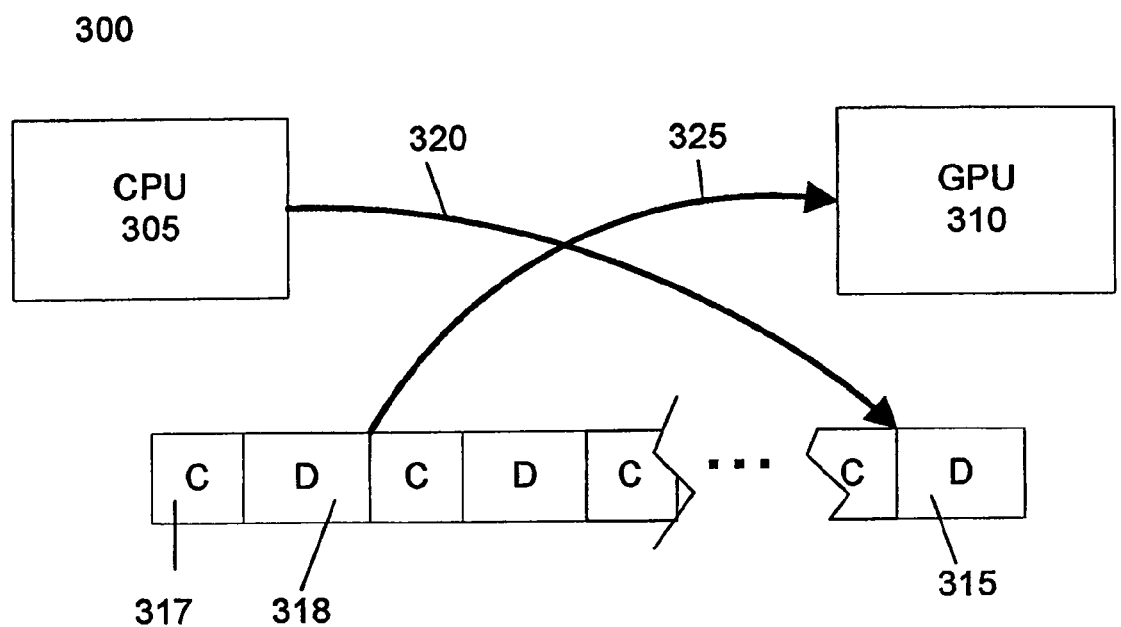
FIG. 3 illustrates a system for communicating rendering commands from a central processing unit (CPU) to a graphics processing unit (GPU) suitable for practicing an embodiment of the invention.

FIG. 3 illustrates a system 300 for communicating rendering commands from a central processing unit (CPU) 305 to a graphics processing unit (GPU) 310 suitable for practicing an embodiment of the invention. In this embodiment, the CPU 305 and the GPU 310 communicate asynchronously through a command buffer 315. Command buffer 315 is stored in memory accessible to both the CPU 305 and the GPU 310. In one embodiment, the command buffer 315 is stored in the computer system's general memory, such as memory 110 discussed in FIG. 1, and is accessible to the GPU 315 via direct memory access-(DMA) transfers. Although not shown in FIG. 3, each GPU in a system with multiple GPUs uses a similar command buffer for receiving communications from the CPU 305.

Command buffer 315 stores sets of commands, such as rendering command 317, and sets of rendering data, such as rendering data 318. In one embodiment, a rendering command is associated with rendering data. The rendering command defines the set of rendering processes to be performed by the GPU on an associated rendering data. In a further embodiment, the rendering data is stored in the command buffer 215 adjacent to the corresponding rendering command.

The CPU 305 writes commands and data sets to the command buffer 315. The command buffer 315 can include a number of commands and data sets. The CPU 305 writes commands and data sets into the command buffer 315 at the location determined by "put" pointer 320. Following each CPU write into the command buffer 315, the CPU 305 increments the put pointer 320 to the next unused location in the command buffer 315. In an embodiment, a driver software program executed by the CPU 305 translates high-level commands from a rendering application into commands and data sets, which are then written into the command buffer 315. In a further embodiment, the driver software program receives high-level commands via an application programming interface, for example DirectX™ or OpenGL™.

The GPU 310 reads commands and data sets from the command buffer 315 at the location determined by "get" pointer 325. Following each GPU read from the command buffer 315, the GPU 310 increments the get pointer 325 to the location of the next command or data set in the command buffer 315.

The CPU 305 and GPU 310 can access the command buffer independently. In an embodiment, the CPU 305 periodically adds new commands and data sets to the command buffer 315, while the GPU 310 continuously reads and processes commands and data sets previously stored by the CPU 305. Provided the CPU 305 stays sufficiently far ahead of the GPU 310, the GPU 310 is able to render images without any idle time waiting for the CPU 305. In an embodiment, the CPU 305 writes commands and data sets for frames several frames ahead of the frame being rendered by the GPU 310.

In an embodiment, the command buffer is limited in size. As an example, a typical command buffer is five megabytes in size. When either the get pointer 325 or put pointer 320 reaches the end of the command buffer 315, the pointer is reset to the location of the beginning of the command buffer 315. In this manner, the command buffer 315 "wraps around," enabling the CPU and GPU to access the command buffer 315 in a continuous loop.

Figure 4:
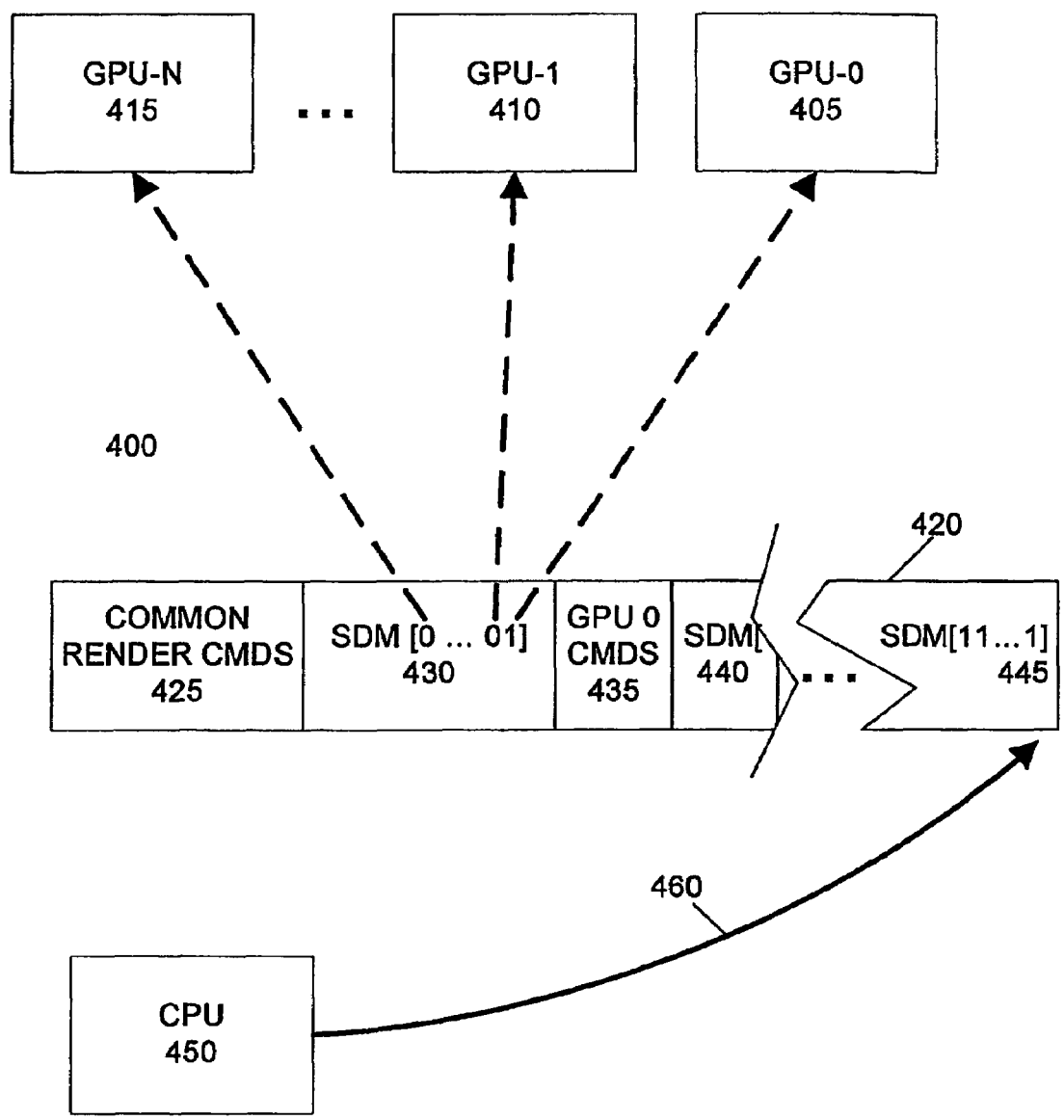
FIG. 4 illustrates a system for programming multiple graphics processing units according to an embodiment of the invention.

FIG. 4 illustrates a system 400 for programming multiple graphics processing units according to an embodiment of the invention. System 400 includes two or more GPUs, for example, ranging from GPU-0, 405 and GPU-1, 410, up to GPU-N 415. All of the GPUs receive programming from the CPU via command buffer 420. As discussed above, CPU 450 adds commands and data sets to the command buffer 420 via put pointer 460. In an embodiment, each GPU reads rendering commands and data sets from the same command buffer. In an alternative embodiment, each GPU has its own identical copy of command buffer 420. In this embodiment, a bridge chip can be used to distribute copies of the command buffer to each of the GPUs. The CPU 450 uses put pointer 460 to write commands and data sets to a broadcast aperture, thereby distributing identical commands and data sets to each of the GPUs.

Command buffer 420 includes common commands and data sets 425, which are to be read and executed by all of the GPUs. To program a subset of the GPUs in the system separately, the CPU writes a Set Device Mask (SDM) command 430 to the command buffer 420. The SDM command 430 designates a subset of GPUs to execute subsequent GPU-specific rendering commands in the command buffer, such as rendering commands 435. As discussed below, any GPUs that are not designated by the SDM command 430 will ignore the GPU-specific rendering commands. However, as discussed below, the non-designated GPUs will continue to read from the command buffer to maintain synchronization. A different subset of GPUs can be designated by a second SDM command 440 to execute another group of GPU-specific rendering commands. Following one or more groups of GPU-specific rendering commands, command buffer 420 includes an SDM command 445 designating all of the GPUs in the system. One or more groups of common rendering commands following SDM command 445 will then be executed by all of the GPUs.

In an embodiment, the SDM command 430 includes a device mask designating the GPUs that will execute subsequent rendering commands. In this embodiment, each GPU is assigned a unique identifier. In a further embodiment, the identifier is assigned to each GPU (and a graphics coprocessor, if present) by a software driver upon system initialization. Each identifier corresponds to a single bit in the device mask. If a bit in the device mask is asserted, then the associated GPU is designated to execute subsequent rendering commands. Conversely, a negated bit instructs a GPU to ignore subsequent rendering commands until its associated bit is reasserted.

For example, SDM command 430 includes a device mask with a value of "0 . . . 01." This device mask indicates that GPU-0, 405, should execute subsequent rendering commands 435, while GPUs 410 and 415 will ignore rendering commands 435. It should be noted that the device mask included with the SDM commands can include any number of bits, thereby enabling the separate programming of any number of GPUs. Further, the device mask can have any combination of asserted or negated bits. This enables the CPU to program two or more GPUs simultaneously. For example, a device mask of "100001111" would indicate that GPUs 0, 1, 2, 3, and 8 are to execute subsequent rendering commands, while GPUs 4, 5, 6, and 7 are to ignore subsequent rendering commands until their corresponding device mask bits are reasserted.

It will be appreciated that the SDM commands described herein are illustrative and that variations and modifications are possible. For example, in one alternative embodiment, instead of inserting a separate SDM command into the command buffer, each rendering command can be accompanied by a set of device mask bits indicating whether a particular GPU should execute or ignore the rendering command.

Figure 5:
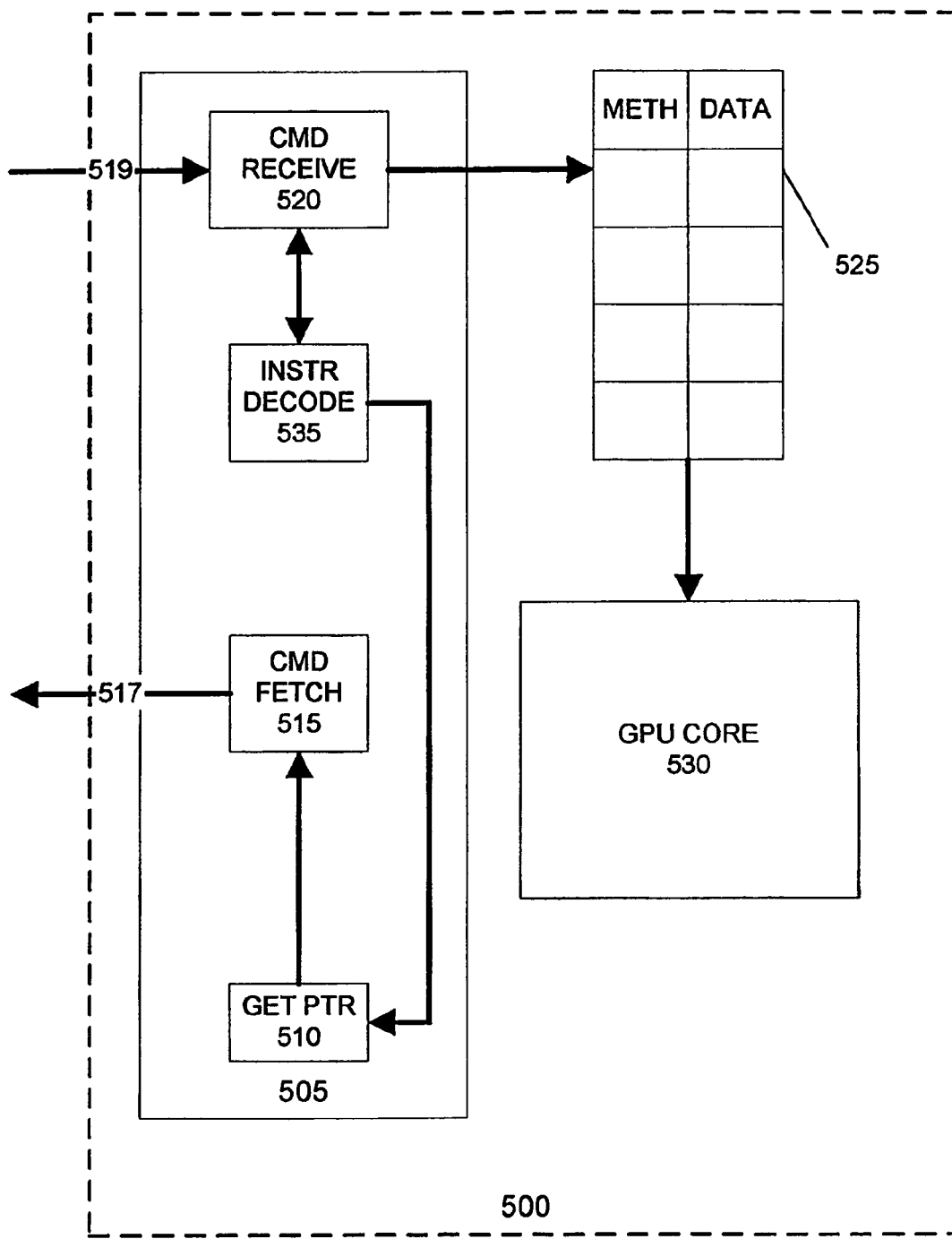
FIG. 5 is a block diagram of a graphics processing unit according to an embodiment of the invention.

FIG. 5 is a block diagram of a graphics processing unit (GPU) 500 according to an embodiment of the invention. GPU 500 includes a GPU front end 505 for retrieving and processing commands from the command buffer and a GPU core 530 for generating pixel data in response to rendering commands. Front end 505 includes a get pointer 510. In an embodiment, the get pointer 510 is stored in a specific memory register. The get pointer 510 is coupled with the command fetch unit 515. Command fetch unit 515 is adapted to initiate the retrieval of a command from the command buffer at the location indicated by the get pointer 510. Command fetch unit 515 sends a command retrieve signal 517 to the command buffer (not shown) to retrieve rendering commands and data sets from the command buffer at the location indicated by the get pointer 510.

Front end 505 includes a command receive unit 520 for receiving a command and data 519 from the command buffer. Command 519 can be classified as either an instruction or a rendering method, and command receive unit 520 includes logic for determining whether the received command is an instruction or a rendering method. Instructions are commands that determine the program flow executed by the GPU 500. Examples of instructions include a jump instruction, which sets the get pointer to a new, non-consecutive location; a no op instruction, which does nothing and is used as a placeholder; and call and return functions, which are used to enter and exit subroutines of commands. The SDM command is also classified as an instruction. Rendering methods are commands that determine the pixel data output by the GPU. In embodiment 500, the front end 505 executes instructions and the GPU core executes rendering methods.

Upon receiving an instruction, the command receive unit 520 forwards the instruction to the instruction decoder 535. Rendering methods are similarly forwarded to method cache 525 to be retrieved and executed by the GPU core 530, subject to the SDM instruction. Upon receiving an SDM instruction, instruction decoder 535 compares the device mask with its own assigned identifier. If the associated bit of the device mask is negated, the instruction decoder 535 disables the link between command receive unit 520 and method cache 525. This causes all subsequent rendering methods received by the GPU 500 to be discarded and ignored.

During the time when GPU 500 is ignoring rendering methods, the front end 505 continues to retrieve commands from the command buffer and to execute any commands that are instructions. For example, instruction decoder 535 can update the get pointer 510 if indicated by a jump, call, or return instruction. In this manner, the GPU state stays synchronized with the other GPUs, even when the commands that are rendering methods are being ignored. Upon receiving a subsequent SDM instruction having the bit associated with GPU 500 reasserted, instruction decoder 535 re-enables the link between the command receive unit 520 and the instruction cache 525. As a result, subsequently received rendering methods are added to the cache 525 and are processed by the GPU core 530.

Figure 6A:
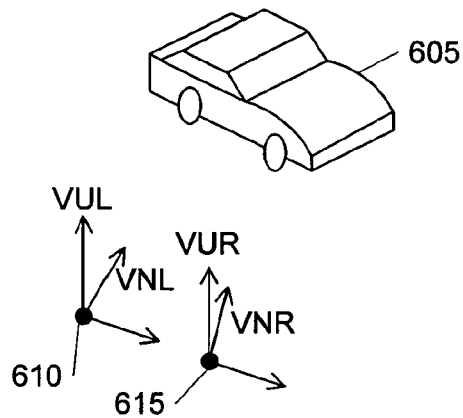
FIGS. 6A-6C illustrate a system for rendering stereo images according to an embodiment of the present invention.
Figure 6B:
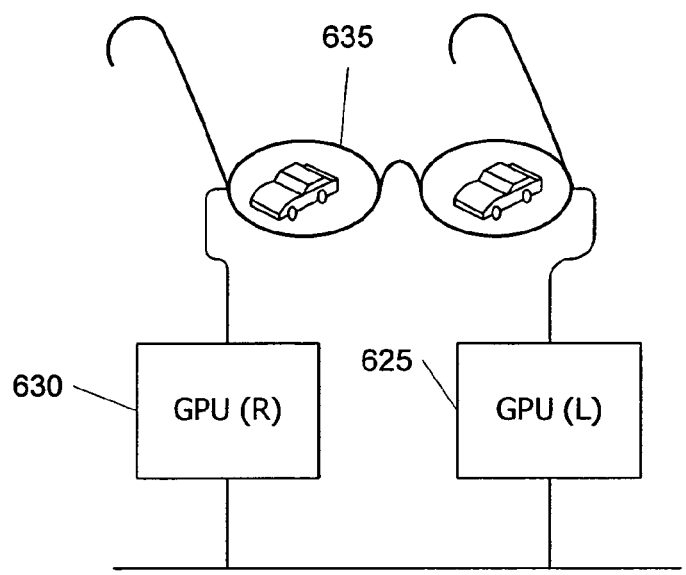
Figure 6C:
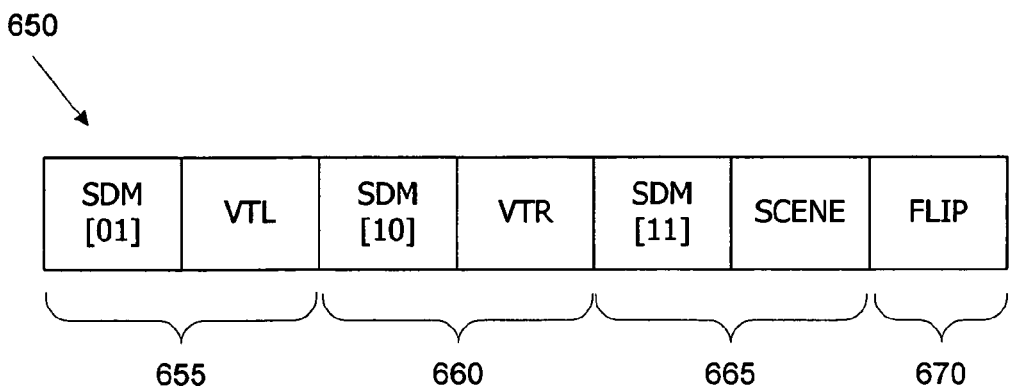

FIGS. 6A-6C illustrate an application of a command stream including SDM commands for rendering stereo images according to an embodiment of the present invention. As is known in the art, stereo image rendering creates the appearance of depth in an image by generating slightly different images for each of the viewer's eyes. FIG. 6A illustrates an operating principle of stereo image generation. Two images of an object 605 defined in 3-D space are rendered using two different viewing coordinate systems: a "left eye" coordinate system 610 and a "right eye" coordinate system 615. The respective origins of coordinate systems 610 and 615 are separated from each other by a small distance, which is advantageously comparable to the distance (scaled to the scene) between a typical viewer's eyes. Each coordinate system 610, 615 defines a view-up vector (VUL, VUR), and the two view-up vectors are advantageously parallel to each other. The respective view direction vectors (VNL, VNR) for each system may be parallel, or they may be slightly skewed toward each other so that the view direction vectors converge at a focal point (not shown in FIG. 6A) set at some distance from the viewing plane.

Each viewing coordinate system 610, 615 is used to define a viewing transform (a "left-eye transform" and a "right-eye transform" respectively) that is applied during rendering to map the 3-D object 605 onto a 2-D screen. Since the viewing coordinate systems 610, 615 are not identical, the viewing transforms will be slightly different, resulting in two slightly different 2-D images being rendered. The 2-D image generated using the left-eye transform is delivered to the viewer's left eye, while the 2-D image generated using the right-eye transform is delivered to the viewer's right eye. If the left-eye and right-eye coordinate systems 610 and 615 are correctly placed and aligned relative to each other, the viewer will perceive a realistic 3D image of the scene.

FIG. 6B illustrates a system 620 for generating a stereo image according to an embodiment of the present invention. System 620 includes two GPUs 625, 630 and a stereo display device 635. GPU 625 generates left-eye images while GPU 630 generates right-eye images, and the images are delivered with appropriate synchronization to stereo display device 635. Stereo display device 635 may be implemented in various ways. For example, stereo goggles that display pixels of the left-eye image ("left-eye pixels") on a left screen and pixels of the right-eye image ("right-eye pixels") on a right screen can be used. Although FIG. 6B shows separate pixel delivery paths for the left and right eyes, it is to be understood that all left-eye and right-eye pixels can be delivered via one path, and pixel counters or other signals may be used by the display device to distinguish left-eye pixels from right-eye pixels. In another embodiment, a single stereo monitor that can deliver different images to left and right eyes might be used; examples of such devices are known in the art. It will be appreciated that a particular implementation of stereo display device 635 is not critical to the present invention, and system 620 may be adapted to include pixel delivery components appropriate to any given stereo display device.

FIG. 6C illustrates a command buffer 650 that can be used to instruct GPUs 625, 630 to render stereo images. Command set 655 includes an SDM command designating GPU 625 and further includes one or more commands specific to GPU 625. Among these commands is a "left-eye viewing transform" (VTL) command that defines a viewing transform using left-eye coordinate system 610 (FIG. 6A). In one embodiment, the VTL command provides a 4×4 viewing transform matrix computed for coordinate system 610 using conventional coordinate-mapping techniques. Command set 660 includes an SDM command designating GPU 630 and further includes one or more commands specific to GPU 630. Among these commands is a "right-eye viewing transform" (VTR) command that defines a viewing transform using right-eye coordinate system 615 (FIG. 6A). Command set 665 includes an SDM command designating both of GPUs 625, 630 and further includes one or more (SCENE) commands for rendering the scene. Among the SCENE commands is a rendering method applying the viewing transform to objects in the scene, as is known in the art. In response to this rendering method, GPU 625 applies the left-eye viewing transform while GPU 630 applies the right-eye viewing transform. In one embodiment, the only difference between the images generated by GPUs 625 and 630 in response to the SCENE commands is the viewing transform.

Flip command set 670 includes one or more commands that are executed when rendering of the scene is complete. Various commands may be included in flip command set 670. Where the display buffers of the GPUs are double buffered (e.g., where new pixel data is written to a "back" buffer while previously rendered pixels in a "front" buffer are read out to display device 635), flip command set 670 may include commands that reverse the identifications of the front and back buffers as is known in the art. Flip command set 670 may also include a block transfer, or blit, command that instructs one of the GPUs 625, 630 to transfer its pixel data to the display memory of the other of GPUs 625, 630 for display; the blit command may be preceded by an SDM command designating just one of the GPUs 625, 630 to perform the transfer. In still other embodiments, flip command set 670 may also include various synchronization instructions for GPUs 625, 630 so that new images for the left eye and right eye are delivered substantially simultaneously to stereo display device 635. Any timing offsets between the left eye and right eye are advantageously small enough to be imperceptible to a human viewer.

Figure 7A:
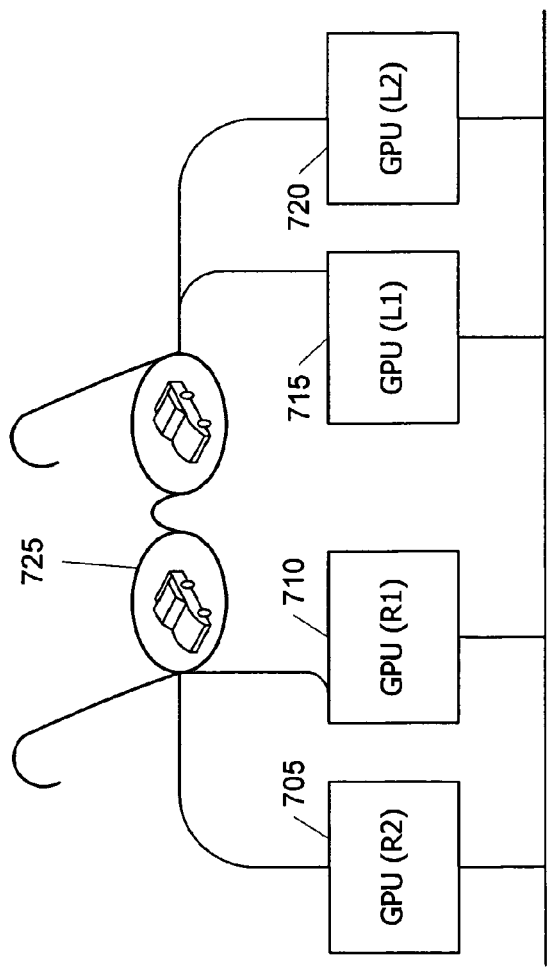
FIGS. 7A and 7B illustrate another system for rendering stereo images according to an embodiment of the present invention.

It will be appreciated that the command buffer described herein is illustrative and that variations and modifications are possible. For instance, multiple GPUs can be used to generate the images for each eye. FIG. 7A illustrates a system 700 for rendering portions of each "eye" for a stereo image in parallel according to an embodiment of the invention. System 700 includes GPUs 705, 710, 715, and 720 and stereo display device 725. In one embodiment, GPUs 705, 710, 715, and 720 are located on separate circuit boards (e.g., expansion cards for a computer system); alternatively, GPUs 705, 710 are located on one circuit board while GPUs 715, 720 are located on a different circuit board, or all four GPUs 705, 710, 715, 720 might all be located on the same circuit board. In a further embodiment, only one of GPUs 705, 710, 715, 720 is directly connected to the display device 725, and the other GPUs deliver data to display device 725 via the directly connected GPU. In yet a further embodiment, system 600 includes a coprocessor that may act as one of the GPUs. Alternative embodiments may have any number of GPUs arranged on any number of circuit boards and may or may not include a coprocessor.

Each of GPUs 705, 710 renders a different portion of an image for viewing by a right eye while each of GPUs 715, 720 renders a different portion of an image for viewing by a left eye. For instance, if the image 200 in FIG. 2A is a right-eye image, GPU 705 might render top portion 205 while GPU 710 renders bottom portion 210 or vice versa. Similarly, if image 200 is a left-eye image, GPU 715 might render top portion 205 while GPU 720 renders bottom portion 210.

Figure 7B:
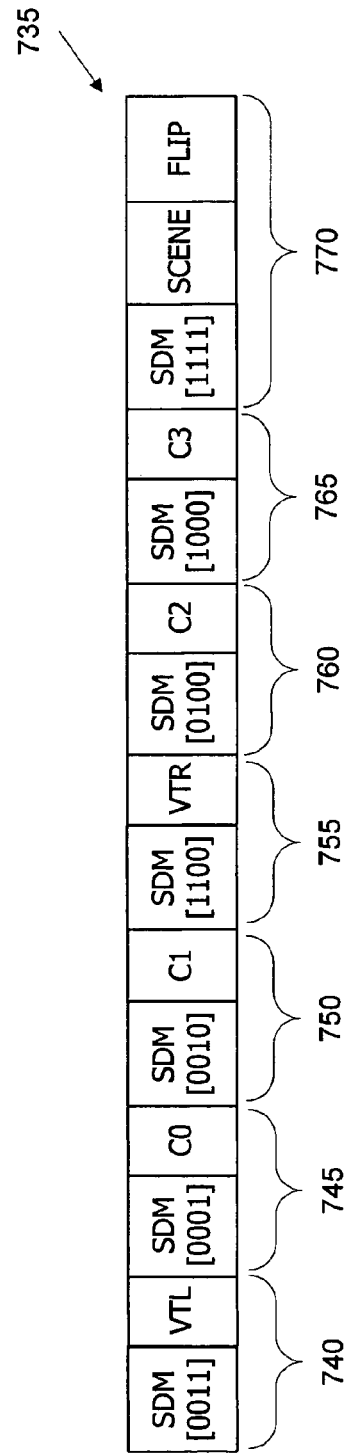

FIG. 7B illustrates an example command buffer 735 that programs GPUs 705, 710, 715, 720 to render stereo images. Command set 740 includes an SDM command designating both left-eye GPUs 715 and 720 and a VTL command defining a left-eye viewing transform as described above. Command set 745 includes an SDM command designating GPU 720 only and a command "C0" setting the clip region for GPU 720 to the portion of the left-eye image to be rendered by GPU 720. Command set 750 includes an SDM command designating GPU 715 only and a command "C1" setting the clip region for GPU 715 to the portion of the left-eye image to be rendered by GPU 715.

Similarly, command set 755 includes an SDM command designating both right-eye GPUs 705 and 710 and a VTR command defining a right-eye viewing transform as described above. Command set 760 includes an SDM command designating GPU 710 only and a command "C2" setting the clip region for GPU 710 to the portion of the right-eye image to be rendered by GPU 710. Command set 765 includes an SDM command designating GPU 705 only and a command "C3" setting the clip region for GPU 705 to the portion of the right-eye image to be rendered by GPU 705.

Command set 770 includes an SDM command with a device mask of "1111" that enables simultaneous programming of all of the GPUs. Common rendering commands ("SCENE" commands) following this SDM command are executed by all of the GPUs. A flip command (or command set) similar to flip command set 670 described above follows the last common rendering command. In some embodiments, the flip command set may include one or more blit commands instructing any GPUs that are not directly connected to display device 725 to transfer their data to another GPU to be read out. For example, in an embodiment where only GPU 720 is directly connected to display device 725, blit commands may be used to copy the portions rendered by GPUs 705, 710, and 715 to the display memory of GPU 720. Because each image portion should be copied to a different location in the display memory of GPU 720, the flip command set may include SDM commands to selectively program GPUs 705, 710, and 715 with different copy commands. GPU 720 outputs the assembled image to display device 725. In another embodiment, GPUs 710 and 720 might both be connected to stereo display device 725, and the flip command set may include SDM commands to selectively program GPU 705 to copy its data to GPU 710 and GPU 715 to copy its data to GPU 720. It will be appreciated that this embodiment can be extended to use any number of GPUs; the total processing power is advantageously divided as equally as practicable between left-eye images and right-eye images.

In still another embodiment, referring to FIG. 7A, GPUs 705 and 710 are operated in an alternate frame rendering mode to render right-eye images while GPUs 715 and 720 are operated in alternate frame rendering mode to render left-eye images. In alternate frame rendering mode, different GPUs render different images in a sequence of images to be viewed by the same eye. For example, GPU 705 might render a first right-eye image while GPU 715 renders a first left-eye image, GPU 710 a second right-eye image and GPU 720 a second left-eye image.

Figure 8:
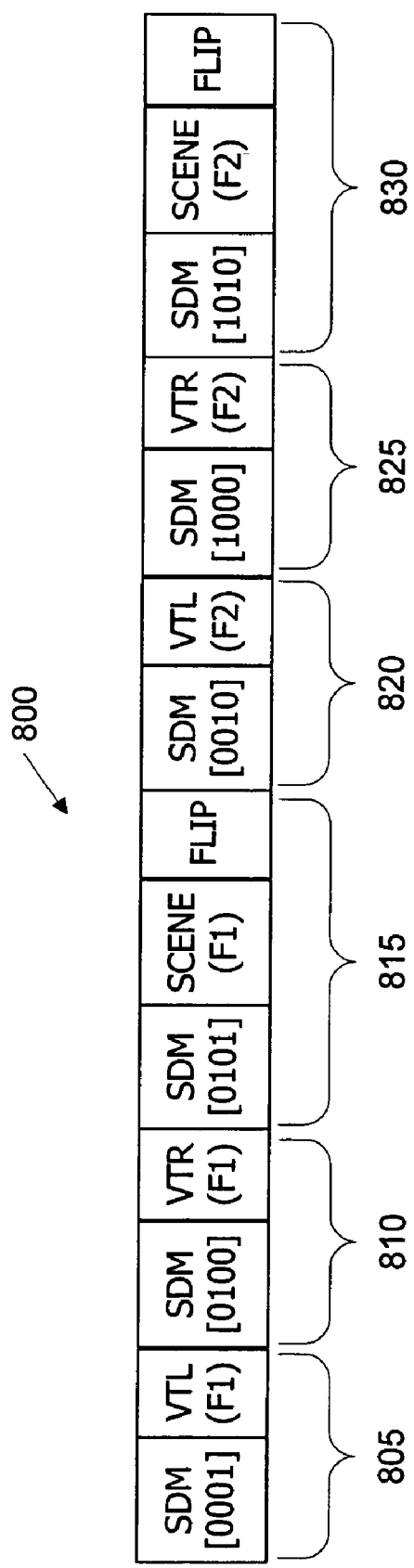
FIG. 8 illustrates another command buffer for rendering stereo images according to an embodiment of the present invention

FIG. 8 illustrates a command buffer 800 for an alternate frame stereo rendering scheme, which uses different pairs of GPUs to simultaneously render different frames in a sequence of stereo images. Command sets 805, 810 and 815 instruct GPU 720 to render a left-eye image and GPU 710 to render a right-eye image for a first frame ("F1"); GPUs 715 and 705 are instructed by the SDM commands to ignore all rendering methods in command sets 805, 810, and 815. Command sets 820, 825, and 830 instruct GPU 715 to render a left-eye image and GPU 705 to render a right-eye image for a second frame ("F2)"; GPUs 720 and 710 are instructed by the SDM commands to ignore all rendering methods in command sets 820, 825 and 830. Each GPU can read the command stream at its own pace; thus, GPUs 715 and 705, which ignore rendering methods in command sets 805, 810 and 815 advantageously reach command set 830 and begin to render frame F2 while GPUs 720 and 710 are still rendering frame F1. This embodiment can be extended to use any number of GPUs.

The invention provides a very efficient way to program multiple GPUs and an optional graphics coprocessor for generating stereo images without consuming an exorbitant amount of system resources. In a typical embodiment, only a single memory aperture is needed to program any number of devices, and all commands that are common to both "eyes" of a stereo image can be written only once.

Although the invention has been discussed with respect to specific examples and embodiments thereof, these are merely illustrative, and not restrictive, of the invention. For instance, the SDM commands are not required to be separate commands in the command stream; in some embodiments, a device mask may be appended to some or all of the commands (e.g., using additional bits), and a device mask appended to a command may affect only that command or all commands until a new device mask is presented. Further, while the invention is discussed with reference to various parallel rendering schemes, the invention can be used in any application where different hardware devices are used to render the left-eye and right-eye portions of a stereo image. Thus, the scope of the invention is to be determined solely by the claims.

What is claimed is:

1. A method for generating a stereo image in a graphics subsystem comprising a plurality of graphics devices, the method comprising:

communicating a first device mask command and a first viewing transform command to each of the plurality of graphics devices, wherein the first device mask command designates a first subset of the plurality of graphics devices to execute the first viewing transform command;

communicating a second device mask command and a second viewing transform command to each of the plurality of graphics devices, wherein the second device mask command designates a second subset of the plurality of graphics devices to execute the second viewing transform command; and communicating a third device mask command and a rendering command to each of the plurality of graphics devices, wherein the third device mask command designates both the first subset and the second subset of the plurality of graphics devices to execute the rendering command; and communicating a program flow command to each of the plurality of graphics devices wherein the program flow command is executed by each of the plurality of graphics devices regardless of the device mask commands to maintain synchronization between the plurality of graphics devices.

2. The method of claim 1 further comprising associating a unique identifier with each of the plurality of graphics devices.

3. The method of claim 2 wherein the first device mask command designates the first subset of the plurality of graphics devices according to the unique identifiers associated with the plurality of graphics devices.

4. The method of claim 3 wherein the first device mask command includes a plurality of bits, each bit associated with one of the unique identifiers and adapted to designate the inclusion of one of the plurality of graphics devices in the first subset of the plurality of graphics devices.

5. The method of claim 1 wherein at least one of the plurality of graphics devices is a graphics processing unit.

6. The method of claim 1 wherein at least one of the plurality of graphics devices is a coprocessor.

7. The method of claim 1 wherein the commands are communicated with each of the plurality of graphics devices via a bridge chip.

8. The method of claim 1 wherein the commands are written into a command buffer adapted to be read asynchronously by each of the plurality of graphics devices.

9. The method of claim 1 where the commands are communicated with each of the plurality of graphics devices via a single memory aperture.

10. A graphics device adapted to operate in parallel with at least one other graphics device to generate a stereo image, the graphics device comprising:
- a core unit adapted to execute commands; and
- a front-end unit adapted to receive a stream of commands via a single memory aperture adapted to communicate commands to the graphics device and the at least one other graphics device and communicate commands from the stream to the core unit, the front-end unit being further adapted to determine which commands to communicate to the core unit based on a device mask command included in the stream,
- wherein the command stream includes a first device mask command associated with a first viewing transform command corresponding to a left-eye view of a scene and a second device mask command associated with a second viewing transform command corresponding to a right-eye view of the scene, and
- wherein the command stream includes a program flow command to each of the plurality of graphics devices wherein the program flow command is executed by each of the plurality of graphics devices regardless of the device mask commands to maintain synchronization between the plurality of graphics devices.

11. The graphics device of claim 10 wherein the front-end unit is further adapted to execute commands associated with program flow regardless of the first and second device mask commands.

12. The graphics device of claim 10 wherein the command stream further includes a third device mask command associated with a rendering command and wherein, in response to the third device mask command, the front-end unit communicates the rendering command to the core unit.

13. The graphics device of claim 12 wherein a unique identifier is associated with the graphics device and wherein the third device mask command and only one of the first and second device mask commands each include a reference to the unique identifier.

14. The graphics device of claim 10 wherein the first, second and third device mask commands each include a bit mask including a bit associated with the graphics device.

15. The graphics device of claim 10 further comprising a cache unit in communication with the front-end unit and the core unit.

16. The graphics device of claim 10 wherein the graphics device is a graphics processing unit.

17. The graphics device of claim 10 wherein the graphics device is a coprocessor.

18. A computer program product comprising:
- a computer readable storage medium encoded with program code, the program code including:
- program code for communicating a first device mask command and a first viewing transform command to each of a plurality of graphics devices, wherein the first device mask command designates a first subset of the plurality of graphics devices to execute the first viewing transform command;
- program code for communicating a second device mask command and a second viewing transform command to each of the plurality of graphics devices, wherein the second device mask command designates a second subset of the plurality of graphics devices to execute the second viewing transform command; and
- program code for communicating a third device mask command and a rendering command to each of the plurality of graphics devices, wherein the third device mask command designates both the first subset and the second subset of the plurality of graphics devices to execute the rendering command; and
- program code for communicating a program flow command to each of the plurality of graphics devices, wherein the program flow command is executed by each of the plurality of graphics devices regardless of the device mask commands to maintain synchronization between the plurality of graphics devices.

* * * * *